MAGNETIC CONTROL DEVICE HAVING A MAGNETIC FORCE FOCUSING MEANS

Filed April 12, 1961 3 Sheets-Sheet 1

MAGNETIC CONTROL DEVICE HAVING A MAGNETIC FORCE FOCUSING MEANS

Filed April 12, 1961 3 Sheets-Sheet 2

MAGNETIC CONTROL DEVICE HAVING A MAGNETIC FORCE FOCUSING MEANS

Filed April 12, 1961 3 Sheets-Sheet 3

3,145,277

MAGNETIC CONTROL DEVICE HAVING A MAGNETIC FORCE FOCUSING MEANS

Jurg A. Senn, Milwaukee, Wis., assignor to Robertshaw Controls Company, a corporation of Delaware Filed Apr. 12, 1961, Ser. No. 102,513
2 Claims. (Cl. 200—84)

The present invention relates to control devices and more particularly to magnetically actuated liquid level controls.

An object of this invention is to transmit control actions through a wall of a sealed container.

Another object of the invention is to employ a stationary source of magnetomotive force for actuating a control device in response to controlled variations in the magnetic attractive capacity of the magnetomotive force.

Another object of the invention is to concentrate magnetic force within an adjustable air gap.

Another object of the invention is to utilize concentrated magnetic force to actuate a control device.

Another object of the invention is to control the concentration of magnetic force in an adjustable air gap in accordance with a condition.

Another object of the invention is to eliminate the response of a magnetic control to low frequency vibration.

The above and other objects and advantages will become apparent from the following description taken in connection with the accompanying drawings wherein.

The invention relates generally to a device for controlling the level of liquid within a container and includes float means within the container adapted to respond to the level of liquid therein and an externally mounted magnetic switching means adapted to respond to the position of the float for controlling the fluid to be introduced or withdrawn from the container. The float assembly and the magnetic switching relay are separated by a nonmagnetic wall and the entire device is adapted to perform under extremes of pressure, temperature, and chemical conditions.

Figure 1:
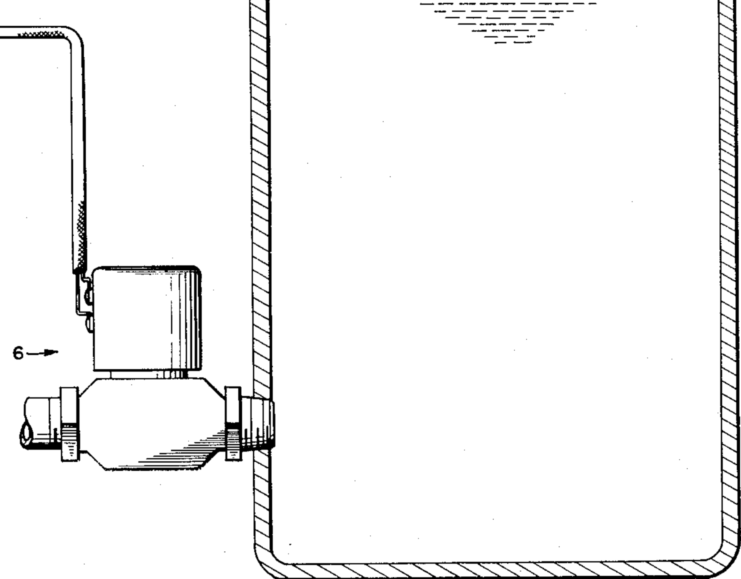
FIG. 1 is a side elevation partly in section of a control embodying the invention.
Figure 3:
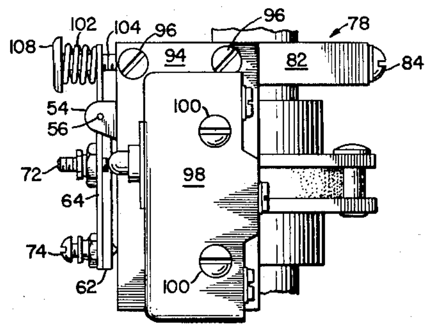
FIG. 3 is an elevation of the detail shown in FIG. 2.

Referring now to FIG. 1, the control 5 is mounted thhrough an appropriate opening in a tank T and is provided with the necessary electrical or pneumatic connections to actuate a controlled element 6 for controlling the introduction or withdrawal of fluid from the tank. As shown, the control 5 includes a substantially shallow cup-shaped base 10 having its open end directed upwardly and provided with an axial opening 12 in its button wall 14. A hollow spud 16 secured to the wall of the opening 12 connects the base 10 to a housing 18 which, in turn, is secured to the tank T.

A nonmagnetic tube 22 is secured by welding or other suitable means within the bore of the hollow spud 16 and has its opposite end closed by plug 24. A cup-shaped cover 28 is secured through its bottom wall to the plug 24 by a screw 26 and is of a diameter substantially the same as that of the base 10 to cooperate therewith to form a switch housing.

Figure 2:
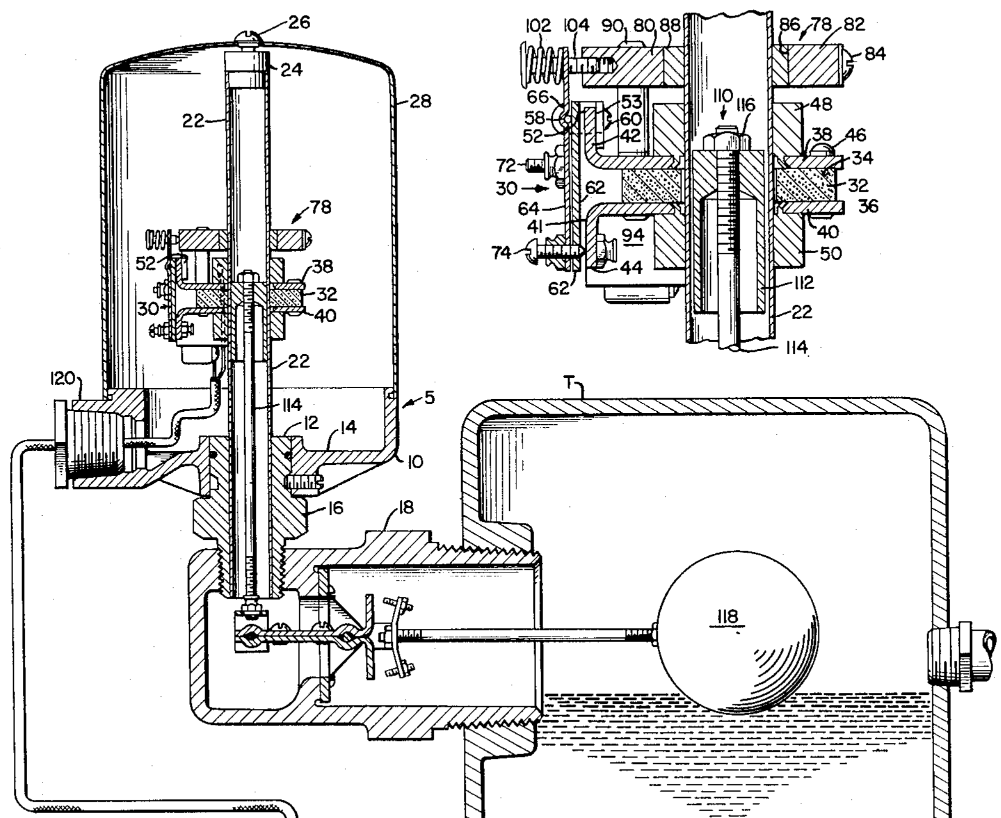
FIG. 2 is an enlarged view in section of a detail of FIG. 1.

Referring now to FIG. 2, a magnetic switching relay 30 is adjustably clamped to the outside of the tube 22 within the switch housing formed by base 10 and the cover 28. The magnetic switching relay 30 includes a permanent magnet 32, preferably in the form of an annular disc, having an opening of sufficient size to receive the tube 22 therethrough. The magnet 32 is polarized such that a pole is formed on each of its two opposing flat surfaces 34, 36. A pair of pole shoes 38, 40, each comprising a substantially rectangular plate of soft iron, are adapted for placement on the top and the bottom of the magnet 32. Each pole shoe is provided with a perpendicularly directed flange portion 42, 44 for a purpose to be more fully described hereinafter. An axial opening in each of the pole shoes is adapted to receive the tube 22 therethrough and a plurality of assembly screws 46 serve to secure the magnet 32 and the pole shoes 38, 40 in their assembled relation as shown in FIG. 2.

A pair of collar members 48, 50 are axially positioned over the tube 22 and one of the collars 48, 50 is suitably secured to the outer surface of each of the pole shoes 38, 40, respectively. Referring again to FIG. 2, it will be seen that the flanges 32, 44 on the pole shoes 38, 40 are positioned to extend in opposite directions in a common plane and, aside from the difference in their respective mounting positions, they are substantially identical in structure. For purposes of illustration, the upper pole shoe 38 is shown as providing a mounting for the pivoted armature of the relay 30 but it is to be understood that the lower pole shoe 40 could be ued with equal effectiveness.

A substantially U-shaped hinge bracket 52 includes a base portion 53 and a pair of outwardly directed leg portions 54 each provided with an opening 56 adapted to receive a hinge pin 58 therethrough. The hinge bracket assembly is firmly attached by its base portion 53 to the back of the upwardly directed flange 42 of the upper pole shoe 38 by screws 60 with the leg portions 54 extending beyond either end of the flange 42. An armature 62 is secured by screws 63 to an actuator plate 64 which is pivotally associated with the upper pole shoe 38 by means of a hinge pin 58 carried in a groove 66 extending across the face of the actuator plate 64 and having its opposite ends each positioned in an opening 56 respectively. The hinge pin 58 is clamped in position within the groove 66 by the overlapping end of the armature 62.

With the structure thus far described, it will be seen that the armature 62 and its integrally attached actuator plate 64 are free to respond to the magnetic attractive capacity of the magnet 32 and its associated pole shoes 38, 40 and a substantial amount of the magnetic flux emanating from the magnet 32 will be focused in the area adjacent the outer faces of the flanges 42, 44 of the pole shoes 38, 40. This area constitutes an adjustable air gap 41 to be more fully described hereinafter.

A pair of ears 70 is integrally formed on the actuator plate 64. An adjusting screw 72 is threadedly mounted on each ear 70 respectively for a purpose apparent hereinafter. Limit stops in the form of a pair of screws 74, 76 are adjustably mounted on the actuator plate 64 and the lower pole shoe flange 44 respectively to limit the pivotal movement of the armature 62 and actuator plate 64 in both directions.

Figure 4:
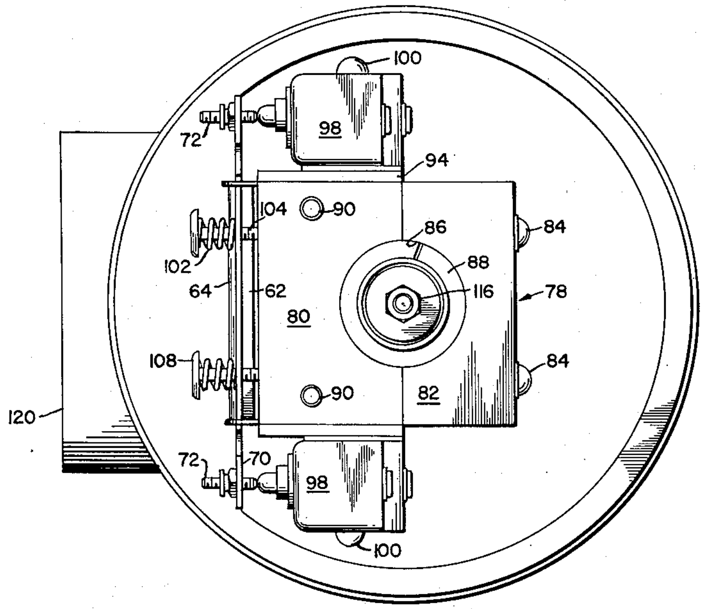
FIG. 4 is a top plan view of the control with the cover removed.
Figure 5:
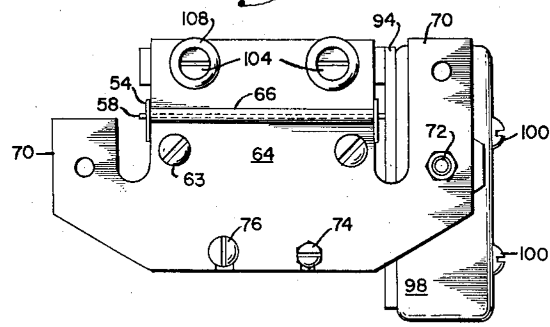
FIG. 5 is a view in front elevation of a detail shown in FIG. 4.

Referring now to FIGS. 2 and 4, a clamp assembly 78 comprises two half portions 80 and 82 connected together by means of a pair of clamp screws 84. An opening 86 is formed in the two half portions 80, 82 of sufficient size to accommodate a split collar 88 establishing firm contact with the tube 22.

The clamp assembly 78 and the magnetic relay 30 are firmly connected in spaced relation by means of a pair of assembly screws 90 carrying a pair of spacer elements 92 respectively positioned between the clamp assembly 78 and relay 30. A pair of mounting plates 94 extend substantially parallel with the tube 22 and are firmly attached by means of screws 96 to opposing sides of the clamp 78. The plates 94 provide mountings for a pair of switching means shown generally at 98 and secured by screws 100. Appropriate adjustment of the screws 72 relative to the ears 70 will render the switching means 98 operative in response to movement of the actuator plate 64. It will be apparent that either of the switching means 98 and associated parts could be dispensed with if desired.

A pair of armature return springs 102 are mounted on the clamp 78 by means of spring screws 104 and washers 108 and are tensioned between the washer 108 and a shoulder provided on the actuator plate 64. The springs 102 serve to rotate the actuator plate 64 and armature 62 in a clockwise direction about the hinge pin 58 as shown generally in FIG. 2.

A magnetic shunt assembly 110 including a piston 112, a piston rod 114, and lock nut 116 are reciprocally mounted within the tube 22. The piston 112 is formed of a ferrous material and is preferably cup-shaped in construction with a threaded opening at the bottom thereof adapted to receive one threaded end of the piston rod 114 to be secured thereto by means of the lock nut 116. Piston 112 is of a length approximately equal to the dimension between the opposite faces of the collars 48, 50. The opposite threaded end of the piston rod 114 is connected to a typical side arm float assembly whereby movement of the float 118 in response to variations in the level of liquid within the tank T will be translated to reciprocate the piston 112 within the tube 22. Since such float assemblies are well known, further description is unnecessary and it will be understood that the assembly is shown only by way of example and forms no part of this invention. Any other suitable means for effecting reciprocation of the piston 112 within the tube 22 could be employed if desired.

Thus, it may be seen that a part of the magnetic force of the magnet 32 is focused within the air gap 41 present between the pivoted armature 62 and the flanges 42, 44 on the pole shoes 38, 40. Control of the degree of concentration of magnetic force at that point is afforded by reciprocating the shunt piston 112 in the tube 22 into and out of the field of force of the magnet 32. Thus diversion of the field will draw a portion of the magnetic force away from the air gap 41 and allow the armature return springs 102 to overcome the remaining magnetic force and move the armature 62 to increase the air gap.

Figure 6:
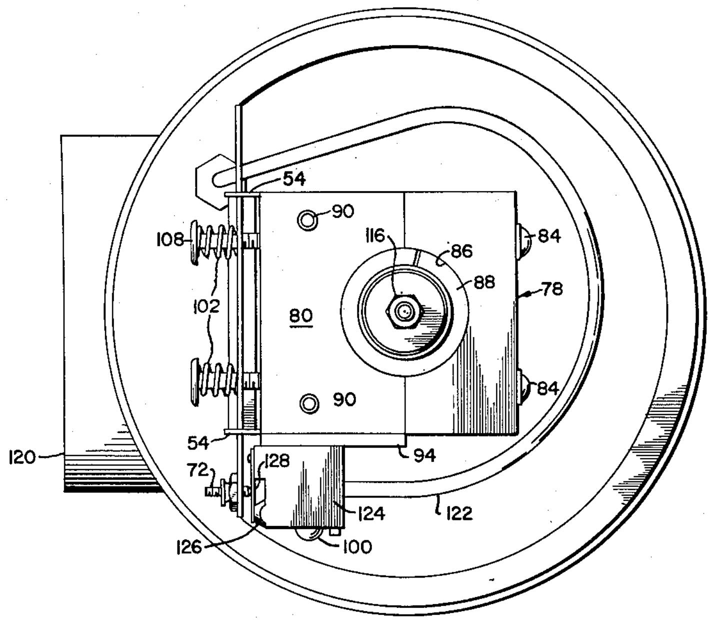
FIG. 6 is a top plan view similar to FIG. 4 but showing a modification of the invention.
Figure 7:
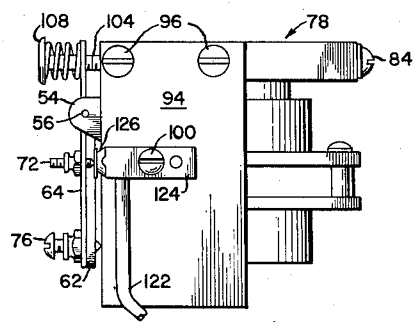
FIG. 7 is a view in side elevation of a detail of the FIG. 6 modification.

Referring now to FIGS. 6, 7, an embodiment utilizing pneumatic switching devices is shown. In this arrangement, the switching means 98 are dispensed with. Instead, a pneumatic pressure tube 122 extends into the switch housing and is connected to a pneumatic pilot assembly 124 mounted on one of the mounting plates 94 in place of the electrical switching device 98 previously described. A nozzle 126 is formed on the pilot 124 and is controlled by means of the flapper 128. The flapper 128 is moved into and out of engagement with the nozzle 126 in the same manner as actuation of the previously described electrical switch occurred, that is, by movement of the armature 62 in response to the degree of concentration of the magnetic flux within the adjustable air gap.

In either embodiment, suitable electrical or pneumatic connections may be attached to the relay 30 by passing them through a conduit entry 120 formed in the base 10.

*Operation*

For the purpose of describing the operation of the device, it will be assumed that suitable linkage is positioned between the float 118 and the piston rod 114 such that upon a rise in the float 118, there will be a corresponding drop in the level of the piston 112. Assuming now that the float 118 is at the top of its arc of travel, the piston 112 will be positioned within the tube 22 at a point below the magnet 32. Under conditions set forth, a portion of the magnetic lines of flux emanating from the magnet 32 are concentrated in the adjustable air gap 41 between the flanges 42, 44 of the pole shoes 38, 40 and the armature 62. The armature 62 and actuator plate 64 are thus caused to rotate on their common hinge pin 58 against the bias of the spring 102 causing actuation of switching means 98 by the adjusting screws 72. The controlled element 6, in this case a solenoid valve, is actuated to shut off the flow of liquid to the tank and the level ceases to rise.

As the liquid is withdrawn from the tank and the level therein falls, the float 118 moves downwardly. The piston 112 is thereby moved upwardly within the tube 22. As the piston moves closer to the magnet 32, a portion of the magnetic lines of flux emanating therefrom are shunted away from the adjustable air gap 41 to the piston 112. With continued upward movement of the piston 112, a predetermined point is reached wherein a sufficient portion of the magnetic force is shunted away from the air gap 41 to enable the armature return springs 102 to overcome the remaining magnetic force. This causes the armature 62 and actuator plate 64 to rotate in a clockwise direction, thus actuating the switches 98 and the controlled element 6 for refilling the tank. A similar scheme of events will obviously take place in connection with the fluid type control of the alternative embodiment.

The relay 30 may be adapted to operate over a wide range of conditions and fluid levels by positioning the assembly at the desired level on the tube 22 and securing it in position by means of the clamp assembly 78.

With the structure thus described, it is possible to utilize a stationary source of magnetic energy and to direct and control the magnetic flux emanating therefrom to actuate various types of control devices.

It is to be understood that the invention is not limited to the details of construction and arrangement of parts disclosed except within the scope of the appended claims.

I claim:

1. In a magnetic control device, the combination comprising a base member, a nonmagnetic tube mounted on said base member and extending upwardly therefrom, a stationary substantially disc-shaped source of magnetic force mounted on said tube, magnetic force focusing means concentrating a portion of the magnetic force emanating from said source including a pair of rectangular soft iron pole shoes secured to opposite sides of said source of magnetic force in a plane perpendicular to the axis of said tube, each of said pole shoes having a flange portion extending in opposite directions away from said source of magnetic force and in a plane common to the plane of said tube, magnetic attractive armature means pivotally mounted on one of said flange portions of one of said pole shoes and movable between first and second positions, means defining an air gap between said armature and said flange portions on said pole shoes, said magnetic force focusing means concentrating said portion of said magnetic force in said air gap, spring means biasing said armature toward the first position, said armature being movable to the second position in response to magnetic attraction by said source of magnetic force, and magnetic shunt means within said tube movable relative to said source controlling the concentration of said portion of said magnetic force in said air gap to actuate said armature between the first and second positions.

2. In a magnetic switch mechanism having a float responsive to control liquid level, the combination comprising nonmagnetic tube means, a stationary permanent magnet adjustably mounted on said tube, magnetic force focusing means comprising a pair of pole shoes mounted adjacent opposite poles of said permanent magnet for concentrating a portion of the magnetic flux emanating from said magnet, each of said pole shoes having a flange portion extending in opposite directions respectively in a common plane away from said magnet and parallel to the axis of said tube, an armature pivoted on one of said flange portions and movable between first and second controlling positions in response to a condition of said magnetic force means, means defining an adjustable air gap between said armature and said flange portion, said magnetic force focusing means concentrating a portion of the magnetic force in said gap for actuating said armature to one of said positions, resilient means mounted on said armature for urging said armature toward the other of said positions, magnetic shunt means mounted within said nonmagnetic tube and being operatively connected to said float for shunting a portion of said concentrated magnetic force away from said air gap in accordance with a liquid level condition whereby to cause said armature to move between positions in accordance with the tension of said resilient means and the degree of concentration of said magnetic force in said air gap, and actuator means mounted on said armature for movement therewith to control said liquid level in accordance with the position of said armature.

References Cited in the file of this patent

UNITED STATES PATENTS

| | | |
|---|---|---|
| 347,589 | Ghegan | Aug. 17, 1886 |
| 970,951 | Reubold | Sept. 20, 1910 |
| 1,548,596 | Ghegan | Aug. 4, 1925 |
| 2,142,680 | Shrode | Jan. 3, 1939 |
| 2,448,251 | Campbell | Aug. 31, 1948 |
| 2,612,572 | Binford | Sept. 30, 1952 |

FOREIGN PATENTS

| | | |
|---|---|---|
| 1,758,105 | France | May 13, 1930 |